(12) United States Patent
Richard et al.

(10) Patent No.: US 8,510,841 B2
(45) Date of Patent: Aug. 13, 2013

(54) DETECTING MALWARE USING PATTERNS

(75) Inventors: Matthew Richard, Holden, MA (US); Monty D. McDougal, St. Paul, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/312,639

(22) Filed: Dec. 6, 2011

(65) Prior Publication Data
US 2013/0145470 A1 Jun. 6, 2013

(51) Int. Cl.
*G06F 11/30* (2006.01)
*G06F 7/00* (2006.01)

(52) U.S. Cl.
USPC .......................................... 726/24; 713/188

(58) Field of Classification Search
None
See application file for complete search history.

(56) References Cited

U.S. PATENT DOCUMENTS

| | | | |
|---|---|---|---|
| 5,442,699 A | | 8/1995 | Arnold et al. |
| 5,696,822 A | * | 12/1997 | Nachenberg ..................... 726/24 |
| 5,765,030 A | * | 6/1998 | Nachenberg et al. ............ 714/33 |
| 5,826,013 A | * | 10/1998 | Nachenberg ..................... 726/22 |
| 7,058,805 B2 | * | 6/2006 | Sibert ............................ 713/161 |
| 7,373,519 B1 | * | 5/2008 | Nachenberg et al. .......... 713/187 |
| 7,421,587 B2 | * | 9/2008 | Cowie et al. ................... 713/188 |
| 7,640,583 B1 | * | 12/2009 | Marinescu et al. .............. 726/22 |
| 7,680,273 B2 | * | 3/2010 | Whitehead et al. ............. 380/46 |
| 7,873,947 B1 | | 1/2011 | Lakhotia et al. |
| 7,940,928 B2 | * | 5/2011 | Sibert ............................ 380/28 |
| 2005/0108555 A1 | * | 5/2005 | Sibert ............................ 713/187 |
| 2007/0094734 A1 | * | 4/2007 | Mangione-Smith et al. ... 726/24 |
| 2008/0263659 A1 | | 10/2008 | Alme |
| 2013/0019140 A1 | * | 1/2013 | Rogers et al. .................. 714/758 |

OTHER PUBLICATIONS

"About Code Papers Links", http://www.reconstructer.org/code.html, 2 pages, Printed Mar. 9, 2011.
"YARA in a nutshell", yara-project, A malware identification and classification tool, yara-project—Project Hosting on Google Code, http://code.google.com/p/yara-project/, 3 pages, Printed Mar. 9, 2011.
"International Application Serial No. PCT/US2012/068224, International Search Report mailed Feb. 15, 2013", 2 pgs.
"International Application Serial No. PCT/US2012/068224, Written Opinion mailed Feb. 15, 2013", 4 pgs.

* cited by examiner

*Primary Examiner* — Christopher Revak
(74) *Attorney, Agent, or Firm* — Schwegman Lundberg & Woessner, P.A.

(57) ABSTRACT

In certain embodiments, a method includes receiving a first file. The method also includes accessing at least one storage module comprising a first malware pattern, a second malware pattern, and a third malware pattern. The second malware pattern is a first permutation of the first malware pattern. The third malware pattern is a second permutation of the second malware pattern and is different than the second malware pattern. The method includes comparing, by at least one processor, the first file to the third malware pattern. In addition, the method includes determining, by the at least one processor, that the first file comprises malware in response to comparing the file to the third malware pattern.

21 Claims, 3 Drawing Sheets

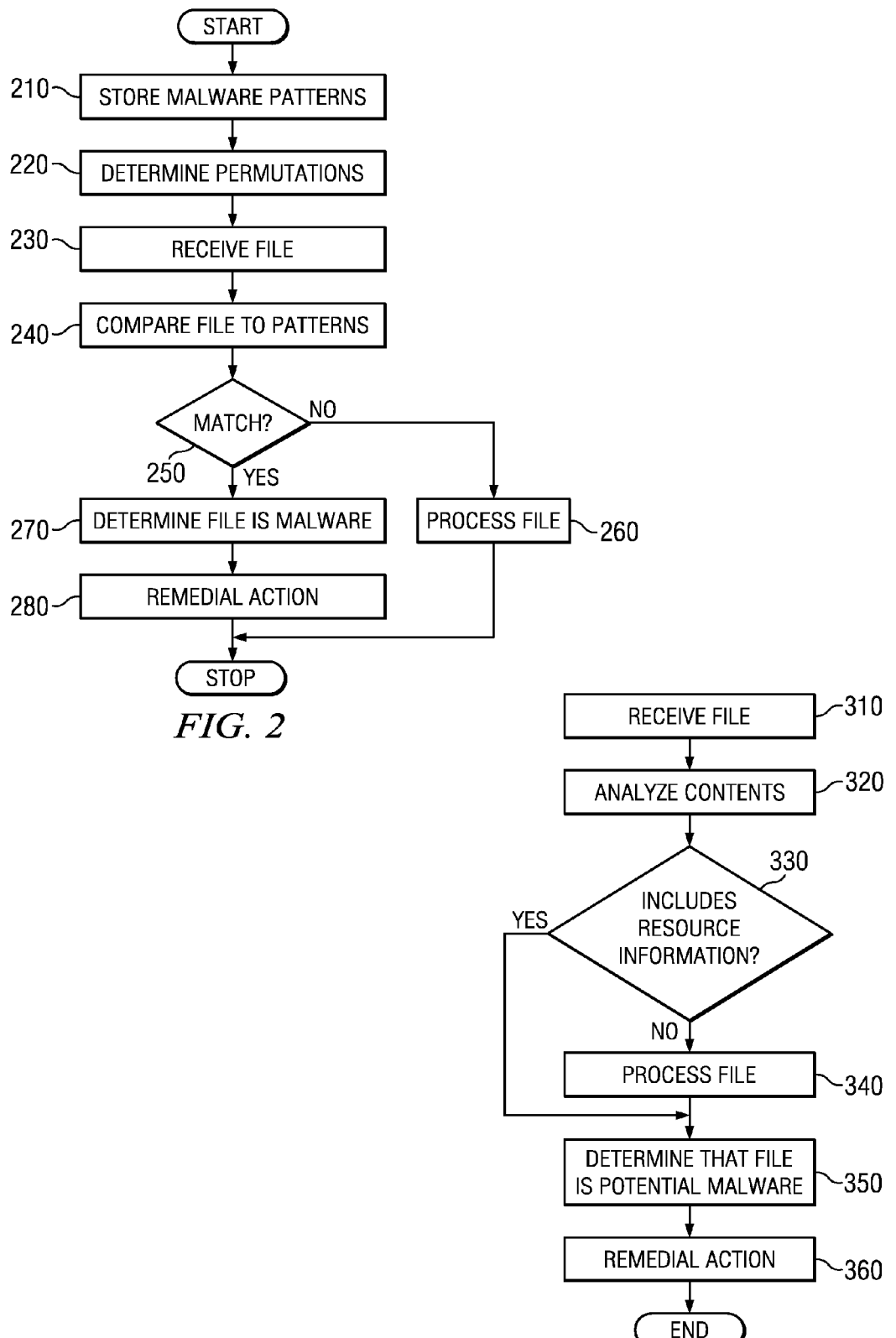

DETECTING MALWARE USING PATTERNS

BACKGROUND

Malware (such as viruses, trojans, and other malicious software) has become increasingly difficult to protect against. Various methods have been used to combat malware but more sophisticated malware continues to abound. Virus detection techniques such as signature-based detection have been thwarted by obfuscation techniques employed by malware authors. This leaves systems vulnerable.

SUMMARY

In certain embodiments, a method includes receiving a first file. The method also includes accessing at least one storage module comprising a first malware pattern, a second malware pattern, and a third malware pattern. The second malware pattern is a first permutation of the first malware pattern. The third malware pattern is a second permutation of the second malware pattern and is different than the second malware pattern. The method includes comparing, by at least one processor, the first file to the third malware pattern. In addition, the method includes determining, by the at least one processor, that the first file comprises malware in response to comparing the file to the third malware pattern.

In certain embodiments, the first permutation and the second permutation may each include a bit rotation or a bit-level XOR operation. The first malware pattern may be a malware payload. The first malware pattern may include shellcode. The method may include receiving a second file and determining whether the second file includes information regarding an internal resource. The method may also include determining that the second file includes malware based on determining that the second file includes information regarding the internal resource.

In certain embodiments, a system includes at least one storage module storing a first malware pattern, a second malware pattern, and a third malware pattern. The second malware pattern is a first permutation of the first malware pattern. The third malware pattern is a second permutation of the second malware pattern and being different than the second malware pattern. The system also includes one or more processors configured to receive a first file and compare the first file to the third malware pattern. The one or more processors are further configured to determine that the first file comprises malware in response to comparing the file to the third malware pattern.

Depending on the specific features implemented, certain embodiments may exhibit some, none, or all of the following technical advantages. According to certain embodiments of the present disclosure, malware that has been obfuscated may be detected. Additionally or alternatively, certain embodiments may detect new malware for which signature-based detection may not be useful and/or effective. Other technical advantages will be readily apparent to one skilled in the art from the following figures, description and claims.

BRIEF DESCRIPTION OF THE DRAWINGS

For a more complete understanding of the present disclosure and its advantages, reference is made to the following descriptions, taken in conjunction with the accompanying drawings, in which:

FIG. 2 is a flowchart illustrating one embodiment of detecting malware using permutations of malware patterns;

FIG. 3 is a flowchart illustrating one embodiment of detecting malware using resource data.

DESCRIPTION OF EXAMPLE EMBODIMENTS

Figure 1:
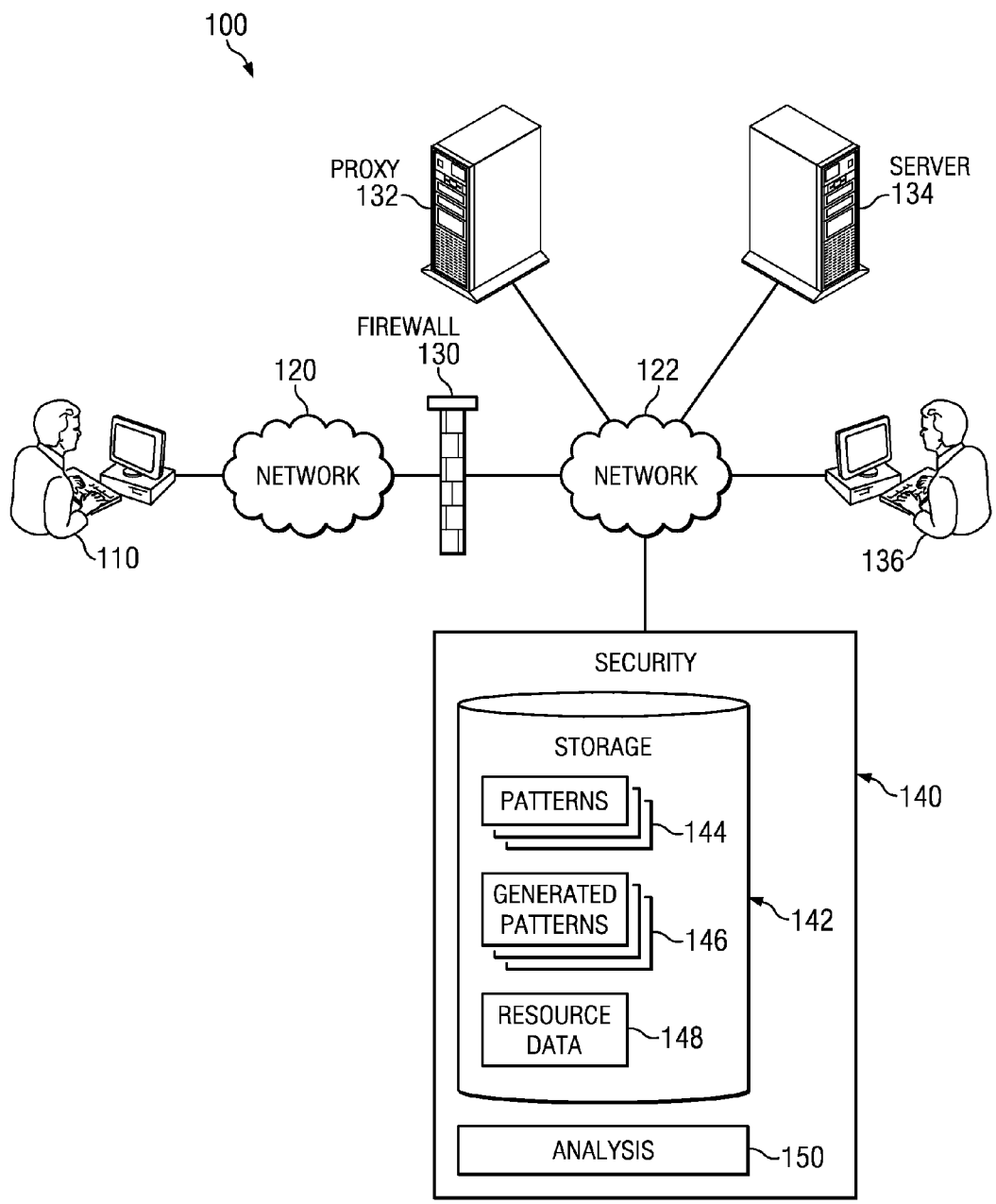
FIG. 1 illustrates one embodiment of a system for detecting malware using patterns.

FIG. 1 illustrates one embodiment of a system 100 for detecting malware using patterns. In the illustrated example, system 100 includes terminal 110, firewall 130, proxy 132, server 134, terminal 136, and security module 140. Although system 100 is illustrated as including particular numbers and types of components in a particular configuration, the present disclosure contemplates system 100 including any suitable number and types of components in any suitable configuration.

Terminal 110 may be communicatively coupled to internal network 122 via network 120. Internal network 122 may communicatively couple firewall 130, proxy 132, server 134, terminal 136 and security module 140 to each other. Security module 140 may include storage 142 that comprises data accessible to analysis module 150. In certain embodiments, analysis module 150 may detect malware using information stored in storage 142. For example, analysis module 150 may compare patterns 144 and generated patterns 146 to a file in determining whether the file is or includes malware. In certain embodiments, malware may include viruses, trojans, worms, spyware, adware, scareware, crimeware, rootkits, and other malicious software.

Terminals 110 and 136 may include any suitable type of processing device that is capable of receiving, transmitting, and/or storing files. In certain embodiments, terminals 110 and 136 represent a computer such as a personal computer. Additionally or alternatively, terminals 110 and 136 may represent a cellular telephone, an electronic tablet, a personal computer (such as a laptop, a desktop, or a server), a personal digital assistant (PDA), or any other suitable device (wireless or otherwise: some of which can perform web browsing), component, or element capable of accessing one or more elements within system 100. Additionally or alternatively, terminals 110 and 136 may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations. In certain embodiments, server 134 and security module 140 may each comprise one or more clusters of virtual or hardware-based computing nodes, a distributed computing infrastructure, or other suitable forms of providing a software service using multiple computers.

Terminals 110 and 136 may include an interface. The interface may comprise any suitable interface for a human user such as a video camera, a microphone, a keyboard, a mouse, or any other appropriate equipment according to particular configurations and arrangements. The interface may be a unique element designed specifically for communications involving system 100. Such an element may be fabricated or produced specifically for matching applications involving a user.

Terminals 110 and 136 may include a display. The display, in certain embodiments, may be a computer monitor. Alternatively, the display may be a projector, speaker, or other device that allows users of terminals 110 and 136 to appreciate information received or stored on terminals 110 and 136.

Users of terminals 110 and 136 may communicate with other users or computing devices via networks 120 and 122. A communication session may include an e-mail session, an instant messaging session, a peer-to-peer messaging session, a chat session, or other messaging sessions. Aspects of system 100, in various embodiments, may also be used in contexts where files are uploaded. For example, some or all of system 100 may be utilized in File Transfer Protocol (FTP) sessions, Wiki sessions, online message boards (such as forums), or other interactive environments. Terminals 110 and 136 may also be used to browse the Internet.

Networks 120 and 122 may each comprise one or more communicative platforms operable to exchange data or information. In certain embodiments, networks 120 and 122 may be any packet data network offering a communications interface or exchange between nodes in system 100. Networks 120 and 122 may include any suitable combination of a local area network (LAN), metropolitan area network (MAN), wide area network (WAN), wireless local area network (WLAN), virtual private network (VPN), the Internet, intranet, and any other appropriate architecture or system that facilitates communications in a network or telephonic environment, including a combination of any networks or systems described above. In various embodiments, nodes may be coupled to networks 120 and 122 by wired and/or wireless mediums which may be provisioned with routers and firewalls (such as firewall 130). In certain embodiments, internal network 122 may not be generally accessible while network 120 may be generally accessible. For example, internal network 122 may be a LAN, enterprise network, or a private network and network 120 may be the Internet.

Firewall 130 may be implemented using any suitable combination of hardware, firmware, and software. Firewall 130 may include intrusion detection systems, gateways (such as a Layer 7 Gateway), authentication modules, a guard, and/or other suitable security frameworks. For example, firewall 130 may be configured to provide security to internal network 122 by analyzing transmissions that enter or leave internal network 122.

Proxy 132 may be implemented using any suitable combination of hardware, firmware, and software. Proxy 132 may be configured to receive communications that originate from or are destined for a location outside internal network 122. For example, server 134 and terminal 136 may send communications to proxy 132 that are destined for network 120. In certain embodiments, proxy 132 may be configured to perform any suitable combination of the following: keep processing systems in internal network 122 anonymous, speed up access to resources (using caching), apply access policies to network services or content, log or audit usage, and scan content (e.g., for data leak protection).

Server 134 and security module 140 may each be implemented using any suitable combination of hardware, firmware, and software. In certain embodiments, server 134 and security module 140 may each comprise a plurality of servers or other equipment, each performing different or the same functions in order to receive and communicate information. Server 134 and security module 140 may each include software and/or algorithms to achieve the operations for processing, communicating, delivering, gathering, uploading, maintaining, and/or generally managing data, as described herein. Server 134 and security module 140 may represent a computer such as a personal computer. As examples, server 134 and security module 140 may represent a cellular telephone, an electronic tablet, a personal computer (such as a laptop, a desktop, or a server), a personal digital assistant (PDA), or any other suitable device (wireless or otherwise: some of which can perform web browsing), component, or element capable of accessing one or more elements within system 100. Additionally or alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations. In certain embodiments, server 134 and security module 140 may each comprise one or more clusters of virtual or hardware-based computing nodes, a distributed computing infrastructure, or other suitable forms of providing a software service using multiple computers. In certain embodiments, security module 140 may be included in other elements in internal network 122, such as server 134 or terminal 136.

In certain embodiments, server 134 may offer one or more services such as a messaging service, an e-mail service, an instant messaging service, a peer-to-peer messaging service, a chat service, an FTP service, a Wiki service, an online message board (such as a forum), a file serving service, a directory service, or other network-based services.

Storage 142 may include one or more storage structures, one or more file systems, as well as other suitable structures for storing and retrieving data. Storage 142 may include any suitable combination of volatile or non-volatile memory. For example, storage 142 may be implemented using any suitable combination of one or more databases, file systems, tables, stacks, heaps, or other suitable storage structures.

In certain embodiments, patterns 144 may include one or more aspects of known malware. For example, malware may include an exploit, shellcode, and a payload. An exploit may be a portion of malware that takes advantage of a vulnerability within an application or system. The exploit may allow for the execution of the shellcode from within the application or system. The shellcode may provide for the delivery of the payload (such as installation of the payload or the storage of the payload within the application or system). For example, the shellcode may cause the payload to be stored in a particular directory or may cause the modification of a file (such as a system file or settings file) such that it includes the payload. The payload may be instructions or data that cause an application or system to behave in a malicious manner. For example, the payload may include instructions that retrieve and send sensitive data or may include instructions that cause e-mail to be sent from the application or system. In certain embodiments, patterns 144 may be: portions of malware (such as a representative portions of exploits, shellcodes, and/or payloads of malware), copies of malware, and/or other data that identifies malware.

In certain embodiments, generated patterns 146 may be permutations of patterns 144. Examples of permutations may be: bit-level rotations, bit-level XOR operations, bit-level shifting, other bit-level operations, reversible scrambles, and reversible hashes. In certain embodiments, permutations may be operations performed on patterns 144 multiple times. For example, one of generated patterns 146 may be one of patterns 144 that has had multiple bit-level operations performed on it. In certain embodiments, this may be advantageous in that permutations of patterns 144 may be pre-computed and stored as generated patterns 146 such that detecting malware may be performed more quickly. Generated patterns 146 may offer an advantage in detecting malware that has been attempted to be hidden or obfuscated through one or more permutations.

In certain embodiments, resource data 148 may include information regarding elements or nodes in internal network 122. Examples of such information include information regarding: network addresses, authentication data, hardware identifiers, protocols, rules, policies, services, and databases. As examples, information in resource data 148 may be regarding firewall 130, proxy 132, server 134, and terminal 136.

In certain embodiments, analysis module 150 may be implemented using any suitable combination of hardware, firmware, and software. As an example, analysis module 150 may be implemented using the CLAMAV engine. Analysis module 150 may be configured to detect malware in internal network 122. Analysis module 150 may use patterns 144, generated patterns 146, and/or resource data 148 when detecting malware. For example, a file that is in internal network 122 (i.e., stored on server 134 or terminal 136) may include malware. The author of the malware may have attempted to hide or obfuscate the malware by creating permutations of all or part of the malware (i.e., performing multiple bit-level rotations on a payload). The malware may be represented in patterns 144. When comparing the file with the permutations of the malware to patterns 144, analysis module 150 may determine that a match is not present. When comparing the file with the permutations of the malware that have been pre-determined and stored as generated patterns 146, analysis module 150 may determine that a match is present. In certain embodiments, this may provide in advantage when detecting malware in that malware that has been obfuscated may be detected. Another advantage that may be present in certain embodiments is that comparing files to permutations of malware may be performed rapidly using pre-determined permutations stored in generated patterns 146.

In certain embodiments, analysis module 150 may detect malware or determine that a file is or contains potential malware using resource data 148. For example, analysis module 150 may compare the contents of a file to resource data 148. If the file includes information that is also included in resource data 148, then analysis module 150 may determine that the file is potential malware or that the file is malware. For example, if the file is a document-type file that includes an address of proxy 132 that is stored in resource data 148, analysis module 150 may determine that the file is potential malware. As another example, if the file is a picture and includes a hardware identifier of terminal 136 (such as a Media Access Control address), then analysis module 150 may determine that the file is potential malware. This may provide an advantage in certain embodiments by providing the ability to detect malware that attempts to use resources within internal network 122.

In certain embodiments, analysis module 150 may be located in firewall 130, proxy 132, server 134, or terminal 136 such that files may be analyzed at these nodes. Storage structure 142 may be located at the same node or a separate node than analysis module 150. For example, some or all of storage structure 142, such as patterns 144, generated patterns 146, and/or resource data 148, may be stored on server 134 and analysis module 150 may be located in terminal 136. In such examples, analysis module 150 may communicate with server 134 to receive information (such as information from generated patterns 146 or resource data 148) before or while analyzing a file located at terminal 136.

FIGS. 2-3 are flowcharts illustrating embodiments of detecting malware in a file by analysis module 150 of FIG. 1.

In general, the steps illustrated in FIGS. 2-3 may be combined, modified, or deleted where appropriate, and additional steps may also be added to the example operation. Furthermore, the described steps may be performed in any suitable order. In certain embodiments, the steps described below may be performed by any suitable combination of the elements discussed above with respect to FIG. 1.

FIG. 2 is a flowchart illustrating one embodiment of detecting malware using permutations of malware patterns. At step 210, in certain embodiments, malware patterns may be stored. Aspects of known malware may be stored in this step. Copies of malware may be stored at this step. In certain embodiments, the information stored at this step may come from files that are determined to be malware based on one or more malware detection schemes (e.g., signature scanning, heuristic analysis, and behavioral analysis), based on review by a human analyst, and/or on other factors. Examples of the information stored at this step include the information in patterns 144 described above with respect to FIG. 1.

At step 220, in certain embodiments, permutations of the malware patterns stored at step 210 may be determined and stored. Examples of permutations determined and stored at this step are discussed above with respect to generated patterns 146 of FIG. 1. Multiple permutations may be performed on one or more of the malware patterns stored at step 210. For example, one of the malware patterns stored at step 210 may have a bit-level rotation applied to it one or more times. As another example, one of the malware patterns stored at step 210 may have a bit-level XOR operation applied to it one or more times. As another example, one of the malware patterns stored at step 210 may have one or more bit-level rotations applied to it followed by one or more bit-level XOR operations applied to it.

At step 230, in certain embodiments, a file may be received that will be analyzed to determine if it is or includes malware by analysis module 150 of FIG. 1. As an example, a user may submit a message or other communication that includes the file. As another example, the file may be received as a result of initiating a security scan, such as a virus scan. As another example, the file may be received as a result of a request sent to a security service to determine if the file is or includes malware.

At step 240, in certain embodiments, the file received at step 230 may be compared to the malware patterns stored at step 210 and the permutations of the malware patterns determined and stored at step 220. This may be accomplished by analysis module 150 of FIG. 1. For example, the file may be compared to the malware patterns stored at step 210 to determine if there is a match between any of the malware patterns stored at step 210 and the contents of the file. This may be accomplished using signatures or hashes. The contents of the file may also be compared to the permutations of the malware patterns determined and stored at step 220. Hashes or signatures may be used to determine if there is a match between the file and the permutations of the malware patterns determined and stored at step 220. For example, signatures may be determined for the malware patterns stored at step 210 and the permutations of the malware patterns determined and stored at step 220. These signatures may be compared to the file received at step 230 to determine if there is a match. In certain embodiments, a match may be determined at this step if: a hash or signature of some or all of the file received at step 230 is the same or similar to one or more of the hashes or signatures of the malware patterns stored at step 210 or the permutations of the malware patterns determined and stored at step 220; some or all of the file received at step 230 is the same or similar to some or all of the malware patterns stored at step 210 or the permutations of the malware patterns determined and stored at step 220; or other suitable techniques for determining that some or all of the file received at step 230 corresponds to the malware patterns stored at step 210 or the permutations of the malware patterns determined and stored at step 220. In certain embodiments, it may be advantageous to compare the file to predetermined and stored permutations of the malware patterns because the permutations may not have to be determined at the time of comparison. This may save power, processing cycles, and/or time.

At step 250, in certain embodiments, it may be determined whether there was a match between the file received at step 230 and the malware patterns stored at step 210 or the permutations of the malware patterns determined and stored at step 220. If there is a match, then step 270 may be performed. If there is not a match, then step 260 may be performed. This step may be performed by analysis module 150 of FIG. 1.

At step 260, in certain embodiments, the file received at step 230 may be processed. This may occur because it has been determined that the file received at step 230 is not to be or include malware. The file may have been determined not to be or include malware by determining that a match does not exist between the file received at step 230 and the malware patterns stored at step 210 as well as the permutations of the malware patterns determined at step 220. Processing the file at this step may include different actions depending on the context associated with the file received at step 230. For example, if the file received at step 230 is an attachment to an e-mail, then processing the file at step 260 may include allowing the e-mail with the attachment to be delivered or received. If the file received at step 230 was downloaded as part of a file transfer session, then processing the file at this step may include allowing the file to remain stored and not deleting the file.

At step 270, in certain embodiments, the file received at step 230 may be determined to be malware. This may be performed by analysis module 150 of FIG. 1. This may occur in response to determining a match between the file received at step 230 and the malware patterns stored at step 210 or the permutations of the malware patterns determined at step 220. At step 280, in certain embodiments, remedial actions may be performed. Such actions may include removing the file, sanitizing the file, quarantining the file, and/or sending the file for review by human analysts. For example, in a messaging context, an indication that the attachment should be removed may be sent to a mail server or agent, which may then remove the attachment from the message that is to be delivered at this step. In certain embodiments, actions such as removing attachments from messages may be performed by the system and the modified message may be sent back to a mail server or agent for delivery or an edited message may be sent by the system. As another example, if the system was being used as a service by another entity (such as a desktop or network security agent), a report may be sent to the entity that may include the determination that the file is malware and information related to the determination (such as the matching malware patterns or the matching permutations of malware patterns).

FIG. 3 is a flowchart illustrating one embodiment of detecting malware using resource data 148 in system 100 of FIG. 1. At step 310, in certain embodiments, a file may be received within internal network 122 that will be analyzed to determine if it is or includes malware by analysis module 150 of FIG. 1. As an example, terminal 110 may submit a message or other communication that includes the file. As another example, the file may be received as a result of initiating a security scan, such as a virus scan. As another example, the file may be received as a result of a request sent to a security service to determine if the file is or includes malware.

At step 320, in certain embodiments, the contents of the file received at step 310 may be analyzed. This step may be performed by analysis module 150 of FIG. 1. For example, the contents of the file may be analyzed to determine whether it contains information regarding nodes or resources of internal network 122. Such information may include addresses of nodes such as proxy 132 or firewall 130, configuration information regarding internal network 122, information regarding one or more services offered by server 134, or information regarding terminal 136. Other aspects of nodes, services, or information regarding internal network 122 may be sought for in the file at this step. At step 330, in certain embodiments, it may be determined whether the contents of the file include resource information regarding internal network 122. For example, this may be performed by determining whether there is a match between the contents of the file analyzed at step 320 and information in resource data 148. If the file does not include such information, then step 340 may be performed. If the file does include such information, then step 350 may be performed.

At step 340, in certain embodiments, the file received at step 310 may be processed. This may occur because it has been determined that the file received at step 310 is not suspected as malware or because the file does not include resource information regarding internal network 122. Processing the file at this step may include different actions depending on the context associated with the file received at step 310. For example, if the file received at step 310 is an attachment to an e-mail, then processing the file at step 340 may include allowing the e-mail with the attachment to be delivered or received. If the file received at step 310 was downloaded as part of a file transfer session, then processing the file at this step may include allowing the file to remain stored and not deleting the file. In certain embodiments, processing the file at this step may include applying other malware detection techniques to the file, such as performing heuristic analysis or performing the steps discussed above with respect to FIG. 2.

At step 350, in certain embodiments, it may be determined that the file is potential malware or that the file is malware. This may be determined because the file includes information regarding resources in internal network 122. In certain embodiments, this may be advantageous because it allows for the detection of new malware that may not have malware signatures created for it or that may not be detected using other techniques such as heuristic techniques. For example, the file received at step 310 may be a document file (such as a MICROSOFT WORD FILE) that includes malware that has not been detected before. The malware may be configured to send sensitive information from internal network 122 to terminal 110 or be configured to exploit a service offered by server 134. Internal network 122 may be configured such that certain outbound communication must pass through proxy 132. The malware in this example may include the address of proxy 132 in order to send the sensitive information out of internal network 122 or may be configured with address or port information regarding the service of server 134 that the malware is designed to exploit. While techniques such as heuristic analysis or signature-based analysis may not detect the malware in this example because it is new, the steps of FIG. 3 may advantageously provide for the detection of the malware because the address of proxy 132 and/or the address or port information of the service offered by server 134 may be included in the malware and would have been detected at steps 320-330.

At step 360, in certain embodiments, remedial actions may be performed. Such actions may include removing the file, sanitizing the file, quarantining the file, and/or sending the file for review by human analysts. For example, in a messaging context, an indication that the attachment should be removed may be sent to a mail server or agent, which may then remove the attachment from the message that is to be delivered at this step. In certain embodiments, actions such as removing attachments from messages may be performed by the system and the modified message may be sent back to a mail server or agent for delivery or an edited message may be sent by the system. As another example, if the system was being used as a service by another entity (such as a desktop or network security agent), a report may be sent to the entity that may include the determination that the file is malware and information related to the determination (such as the resource information regarding internal network 122 that was detected at steps 320-330).

Figure 4:
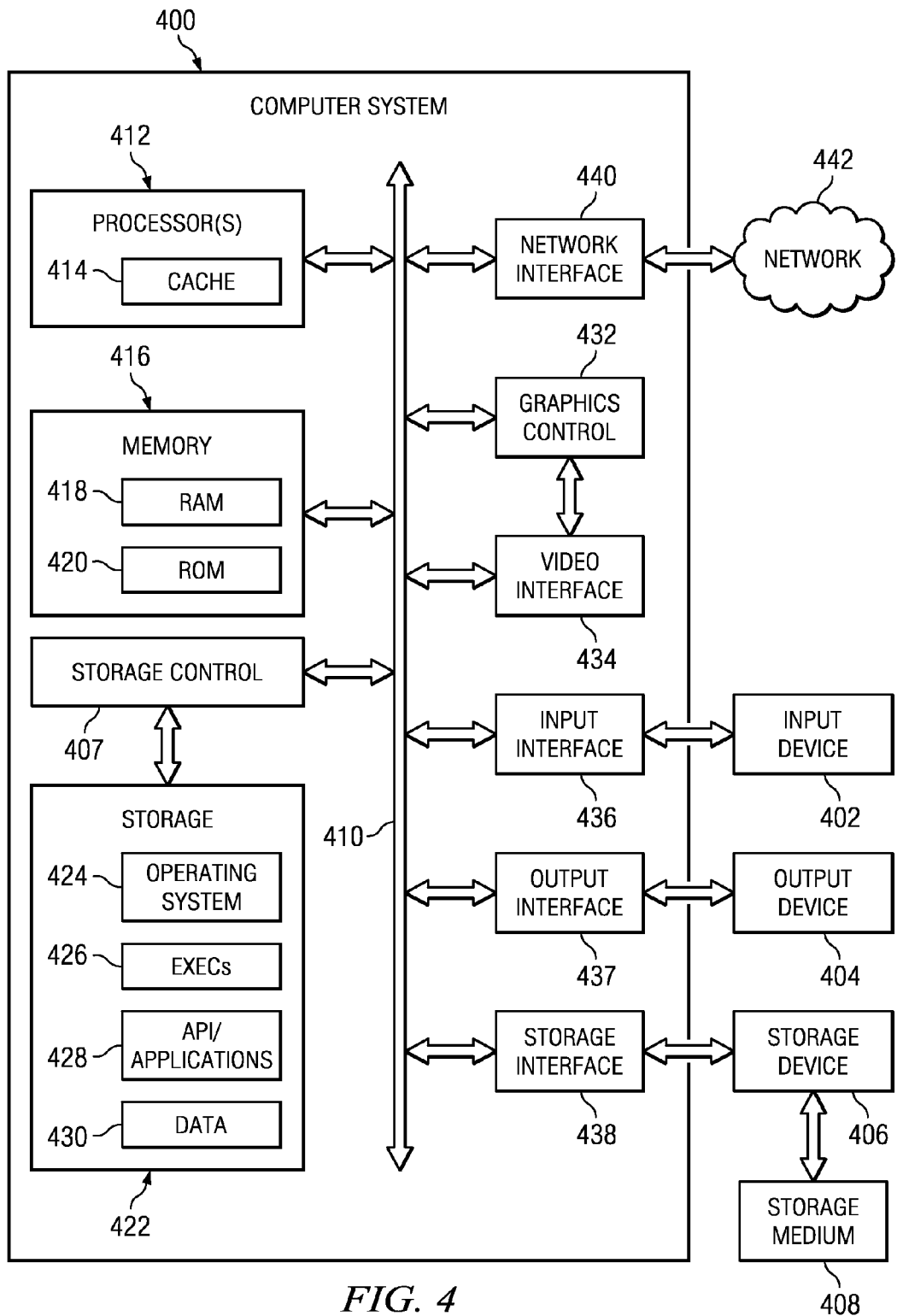
FIG. 4 illustrates an example computer system suitable for implementing one or more portions of certain embodiments.

FIG. 4 illustrates an example computer system 400 suitable for implementing one or more portions of certain embodiments. Although the present disclosure describes and illustrates a particular computer system 400 having particular components in a particular configuration, the present disclosure contemplates any suitable computer system having any suitable components in any suitable configuration. Moreover, computer system 400 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. One or more components of FIG. 1 and one or more steps of FIGS. 2-3 may be implemented using all of the components, or any appropriate combination of the components, of computer system 400 described below.

Computer system 400 may have one or more input devices 402 (which may include a keypad, keyboard, mouse, stylus, or other input devices), one or more output devices 404 (which may include one or more displays, one or more speakers, one or more printers, or other output devices), one or more storage devices 406, and one or more storage medium 408. An input device 402 may be external or internal to computer system 400. An output device 404 may be external or internal to computer system 400. A storage device 406 may be external or internal to computer system 400. A storage medium 408 may be external or internal to computer system 400. In certain embodiments, terminals 110 and 136, firewall 130, proxy 132, server 134, and security module 140 of FIG. 1 may be implemented using some or all of the components described above included in computer system 400.

System bus 410 couples subsystems of computer system 400 to each other. Herein, reference to a bus encompasses one or more digital signal lines serving a common function. The present disclosure contemplates any suitable system bus 410 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 400 includes one or more processors 412 (or central processing units (CPUs)). A processor 412 may contain a cache 414 for temporary local storage of instructions, data, or computer addresses. Processors 412 are coupled to one or more storage devices, including memory 416. Memory 416 may include random access memory (RAM) 418 and read-only memory (ROM) 420. Data and instructions may transfer bidirectionally between processors 412 and RAM 418. Data and instructions may transfer unidirectionally to processors 412 from ROM 420. RAM 418 and ROM 420 may include any suitable computer-readable storage media.

Computer system 400 includes fixed storage 422 coupled bi-directionally to processors 412. Fixed storage 422 may be coupled to processors 412 via storage control unit 407. Fixed storage 422 may provide additional data storage capacity and may include any suitable computer-readable storage media. Fixed storage 422 may store an operating system (OS) 424, one or more executables (EXECs) 426, one or more applications or programs 428, data 430 and the like. Fixed storage 422 is typically a secondary storage medium (such as a hard disk) that is slower than primary storage. In appropriate cases, the information stored by fixed storage 422 may be incorporated as virtual memory into memory 416. In certain embodiments, fixed storage 422 may include network resources, such as one or more storage area networks (SAN) or network-attached storage (NAS). In certain embodiments, memory storage structure 142 and analysis module 150 of FIG. 1 may be implemented using configurations such as the description of memory 416 above.

Processors 412 may be coupled to a variety of interfaces, such as, for example, graphics control 432, video interface 434, input interface 436, output interface 437, and storage interface 438, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 440 may couple processors 412 to another computer system or to network 442. Network interface 440 may include wired, wireless, or any combination of wired and wireless components. Such components may include wired network cards, wireless network cards, radios, antennas, cables, or any other appropriate components. With network interface 440, processors 412 may receive or send information from or to network 442 in the course of performing steps of certain embodiments. Certain embodiments may execute solely on processors 412. Certain embodiments may execute on processors 412 and on one or more remote processors operating together. In certain embodiments, processors 412 may be used to implement firewall 130, proxy 132, server 134, terminals 110 and 136, and analysis module 150 of FIG. 1 and/or may perform the steps specified in instructions or code included in these nodes as well as the steps of FIGS. 2-3.

In a network environment, where computer system 400 is connected to network 442, computer system 400 may communicate with other devices connected to network 442. Computer system 400 may communicate with network 442 via network interface 440. For example, computer system 400 may receive information (such as a request or a response from another device) from network 442 in the form of one or more incoming packets at network interface 440 and memory 416 may store the incoming packets for subsequent processing. Computer system 400 may send information (such as a request or a response to another device) to network 442 in the form of one or more outgoing packets from network interface 440, which memory 416 may store prior to being sent. Processors 412 may access an incoming or outgoing packet in memory 416 to process it, according to particular needs.

Certain embodiments involve one or more computer-storage products that include one or more tangible, computer-readable storage media that embody software for performing one or more steps of one or more processes described or illustrated herein. In certain embodiments, one or more portions of the media, the software, or both may be designed and manufactured specifically to perform one or more steps of one or more processes described or illustrated herein. In addition or as an alternative, in certain embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In certain embodiments, software may be machine code which a compiler may generate or one or more files containing higher-level code which a computer may execute using an interpreter.

As an example and not by way of limitation, memory 416 may include one or more tangible, non-transitory, computer-readable storage media embodying software and computer system 400 may provide particular functionality described or illustrated herein as a result of processors 412 executing the software. Memory 416 may store and processors 412 may execute the software. Memory 416 may read the software from the computer-readable storage media in mass storage device 416 embodying the software or from one or more other sources via network interface 440. When executing the software, processors 412 may perform one or more steps of one or more processes described or illustrated herein, which may include defining one or more data structures for storage in memory 416 and modifying one or more of the data structures as directed by one or more portions the software, according to particular needs. In certain embodiments, storage structure 142 of FIG. 1 may be implemented using configurations such as the description of memory 416 above.

In certain embodiments, the described processing and memory elements (such as processors 412 and memory 416) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing. In addition or as an alternative, computer system 400 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although several embodiments have been illustrated and described in detail, it will be recognized that modifications and substitutions are possible without departing from the spirit and scope of the appended claims.

What is claimed is:

1. A method comprising:
   receiving a first file;
   accessing at least one storage module comprising a first malware pattern, a second malware pattern, and a third malware pattern, the second malware pattern being a first permutation of the first malware pattern, the third malware pattern being a second permutation of the second malware pattern and different than the second malware pattern, wherein one or more of the first permutation and the second permutation comprises a bit rotation;
   comparing, by at least one processor, the first file to the third malware pattern; and
   determining, by the at least one processor, that the first file comprises malware in response to comparing the file to the third malware pattern.

2. The method of claim 1, wherein one or more of the first permutation and the second permutation comprises a bit-level XOR operation.

3. The method of claim 1, wherein the first malware pattern is a malware payload.

4. The method of claim 1, wherein the first malware pattern comprises a malware payload and shellcode.

5. The method of claim 1, further comprising:
   receiving a second file;
   determining whether the second file comprises information regarding an internal resource; and
   determining that the second file comprises malware based on determining that the second file comprises the information regarding the internal resource.

6. The method of claim 5, wherein the information regarding an internal resource comprises an address of a proxy.

7. The method of claim 1, further comprising storing the second malware pattern and the third malware pattern prior to receiving the first file.

8. A system comprising:
   at least one storage module storing a first malware pattern, a second malware pattern, and a third malware pattern, the second malware pattern being a first permutation of the first malware pattern, the third malware pattern being a second permutation of the second malware pattern and being different than the second malware pattern, wherein one or more of the first permutation and the second permutation comprises a bit rotation; and
   one or more processors configured to:
   receive a first file;
   compare the first file to the third malware pattern; and
   determine that the first file comprises malware in response to comparing the file to the third malware pattern.

9. The system of claim 8, wherein one or more of the first permutation and the second permutation comprises a bit-level XOR operation.

10. The system of claim 8, wherein the first malware pattern is a malware payload.

11. The system of claim 8, wherein the first malware pattern comprises a malware payload and shellcode.

12. The system of claim 8, wherein the one or more processors are further configured to:
    receive a second file;
    determine whether the second file comprises information regarding an internal resource; and
    determine that the second file comprises malware based on determining that the second file comprises the information regarding the internal resource.

13. The system of claim 12, wherein the information regarding an internal resource comprises an address of a proxy.

14. The system of claim 8, wherein the one or more processors are further configured to store the second malware pattern and the third malware pattern in the at least one storage module prior to receiving the first file.

15. At least one non-transitory computer-readable medium comprising instructions that, when executed by one or more processors, are configured to:
   receive a first file;
   access at least one storage module storing a first malware pattern, a second malware pattern, and a third malware pattern, the second malware pattern being a first permutation of the first malware pattern, the third malware pattern being a second permutation of the second malware pattern and different than the second malware pattern, wherein one or more of the first permutation and the second permutation comprises a bit rotation;
   compare the first file to the third malware pattern; and
   determine that the first file comprises malware in response to comparing the file to the third malware pattern.

16. The at least one non-transitory computer-readable medium of claim 15, wherein one or more of the first permutation and the second permutation comprises a bit-level XOR operation.

17. The at least one non-transitory computer-readable medium of claim 15, wherein the first malware pattern is a malware payload.

18. The at least one non-transitory computer-readable medium of claim 15, wherein the first malware pattern comprises a malware payload and shellcode.

19. The at least non-transitory one computer-readable medium of claim 15, wherein the instructions are further configured to:
   receive a second file;
   determine whether the second file comprises information regarding an internal resource; and
   determine that the second file comprises malware based on determining that the second file comprises the information regarding the internal resource.

20. The at least one non-transitory computer-readable medium of claim 19, wherein the information regarding an internal resource comprises an address of a proxy.

21. The at least one non-transitory computer-readable medium of claim 15, wherein the instructions are further configured to store the second malware pattern and the third malware pattern prior to receiving the first file.

* * * * *